No. 850,029. PATENTED APR. 9, 1907.
G. H. MEEKER.
METHOD OF SEALING METAL IN GLASS.
APPLICATION FILED JUNE 19, 1906.
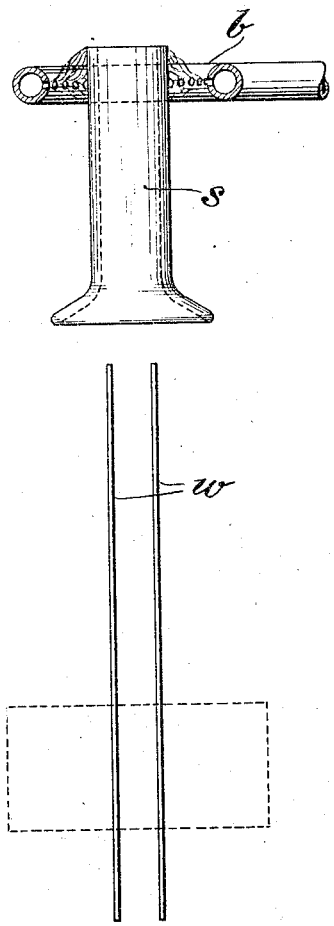
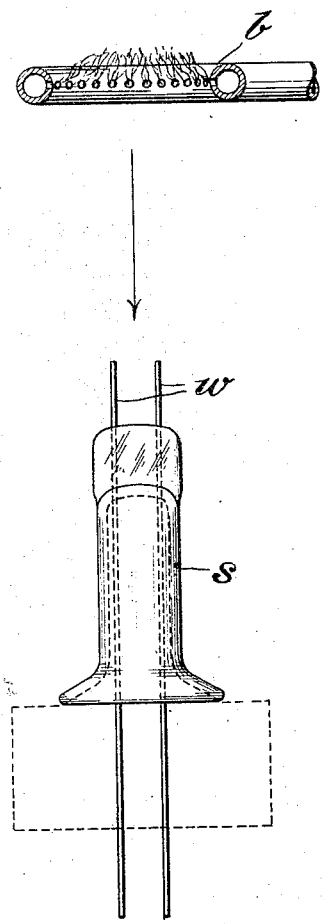
WITNESSES:
Jas. C. Wobusmith
Ella M. Ware
INVENTOR
George H. Meeker,
BY
Walter C. Pusey
ATTORNEY.

UNITED STATES PATENT OFFICE.

GEORGE H. MEEKER, OF MEDIA, PENNSYLVANIA.

METHOD OF SEALING METAL IN GLASS.

No. 850,029.    Specification of Letters Patent.    Patented April 9, 1907.

Application filed June 19, 1906. Serial No. 322,402.

*To all whom it may concern:*

Be it known that I, GEORGE H. MEEKER, a citizen of the United States, and a resident of Media, Delaware county, State of Pennsylvania, have invented certain new and useful Improvements in Methods of Sealing Metal in Glass, of which the following is a full, clear, and exact description.

The object of this invention is to provide a novel method of sealing oxidizable metal in glass to secure an absolutely tight joint between said glass and metal.

Although the invention may be useful for many purposes, it is particularly adapted for use in connection with sealing into the stem of an incandescent electric lamp the leading-in wires to which the usual carbon filament is attached within the lamp, and I shall therefore describe my invention as applied to such use.

In the well-known incandescent electric lamp it is necessary to use platinum wires extending from the termini of the carbon filament within the lamp into the inner end of the stem of the lamp, the inner end of which stem is sealed upon said platinum wires, thereby securing an air-tight joint. Many attempts have been made to reduce the amount of platinum wire necessary for this purpose, as it is quite expensive; but it has been found impossible heretofore to do away entirely with the use of platinum wires because in the process of sealing the wire in the stem it is absolutely essential that an air-tight joint between the wire and the glass shall be produced, and platinum is the only metal having substantially the same coefficient of heat expansion and contraction as the glass which will not oxidize when subjected with the glass to the heat necessary to render the glass plastic that it may be sealed down upon the wires.

In carrying out my invention I use a nickel-steel or nickel-iron which can be produced having substantially the same coefficient of heat expansion and contraction as glass. This metal, however, rapidly oxidizes when subjected to heat in the presence of air.

The usual method of sealing wires into the glass is to extend the usual copper wires having the short platinum wires joined to the upper ends thereof into the lower end of the tubular stem, so that the free ends of the platinum wires will project a short distance beyond the inner end of the stem, and the other ends thereof will be within the stem. The wires and inner end of the stem, being retained in this position, are heated in a burner until the said end of the glass stem becomes plastic, whereupon the operator by a suitable tool squeezes the walls of the inner end of the stem together, thereby securely sealing the wires within the said stem. This heating of the platinum wires at the same time the glass is heated does not affect said wires in any way to prevent the formation of an air-tight joint between said wires and the glass stem. If nickel-steel or nickel-iron wires having substantially the same coefficient of heat expansion as the glass be substituted for the platinum wires and subjected to this method of treatment, the nickel-steel or nickel-iron when heated in the presence of air with the glass will become oxidized and after the glass is squeezed down to form the seal between the stem and said wires an air-tight joint will frequently not be secured because the air will sometimes leak through this oxid coating on the wires into the lamp.

In carrying out my present invention I place the nickel-steel or nickel-iron wires in suitable relation to the tubular stem, but exterior to the same, then subject the inner end of the stem to heat until it is brought to a plastic condition, when it is quickly withdrawn from said heat and brought to a position inclosing said wires, whose ends project the required distance through the inner end of said stem, and the plastic inner end of the stem is by suitable manipulation quickly squeezed down upon said wires, thereby sealing the same into the glass before said wires have had opportunity to become heated to oxidizing temperature, whereby an absolutely air-tight joint is secured between the wires and the glass.

In the accompanying drawings I have illustrated diagrammatically my method as applied to the stem of an incandescent electric lamp.

Figure 1 shows the wires *w* in a position exterior to the stem *s*, the inner end of which is being heated to plastic condition by a circular burner *b*. Fig. 2 shows the stem removed from the burner-flame and encompassing the wires, the inner end of the stem having been squeezed together to seal the wires within the same.

I have not deemed it necessary herein to describe the operation of assembling the stem within the lamp-bulb and securing the same thereto nor of how the outer ends of the wires *w* are secured to the usual lamp-cap and inner ends thereof to the carbon filament, as these operations are well known to the manufacturers of lamps of this type.

I do not wish to be understood as limiting myself to the use of nickel-steel or nickel-iron alone in carrying out my process, for other metals which would oxidize when heated in the presence of air may be substituted for the nickel-steel or nickel-iron. Nor is it essential that either the glass or the metal be moved with relation to each other in my process, as the metal may be held in proper relation to the glass during the heating of the latter or be inclosed in a removable heat-insulator, such as an asbestos covering, which when the glass has been heated to plastic condition would be removed and the glass quickly sealed upon the metal before it had opportunity to become heated.

Having thus described my invention, I claim as new and desire to secure by Letters Patent—

1. The process of sealing oxidizable wire within glass, which consists in heating the glass to plastic condition without heating the wire to oxidizing temperature, and so quickly pressing the plastic glass around said wire that the wire will be sealed therein and the air excluded therefrom before said wire has become heated to oxidizing temperature, substantially as set forth.

2. The process of sealing oxidizable wires within incandescent lamp stems which consists in heating a portion of the tubular stem to plastic condition without heating said wires to oxidizing temperature, and so quickly pressing the plastic portion of said stem together that the wires will be sealed therein and the air excluded therefrom before said wires have become heated to oxidizing temperature, substantially as set forth.

3. The process of sealing oxidizable wires within incandescent-lamp stems, said wires having substantially the same coefficient of heat expansion and contraction as the stem, which consists in heating a portion of the tubular stem to plastic condition, at a point away from said wires, bringing the tubular stem to position inclosing said wires, and pressing the plastic portion of the stem together, embedding said wires therein before they have become heated to oxidizing temperature.

In testimony whereof I have hereunto affixed my signature.

GEORGE H. MEEKER.

Witnesses:
A. V. GROUPE,
WALTER C. PUSEY.